Oct. 31, 1961   J. M. WHITE   3,006,535
SUCTION BOOSTER
Filed March 5, 1954
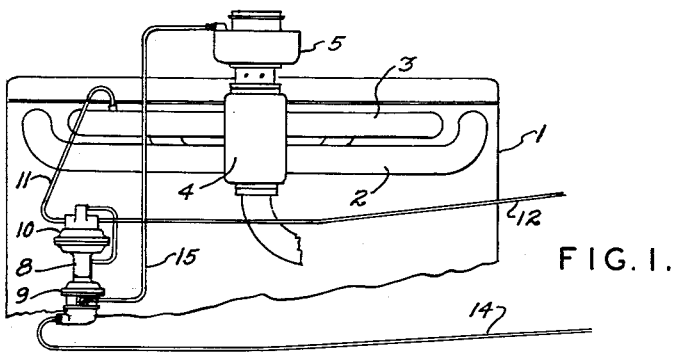
FIG. 1.
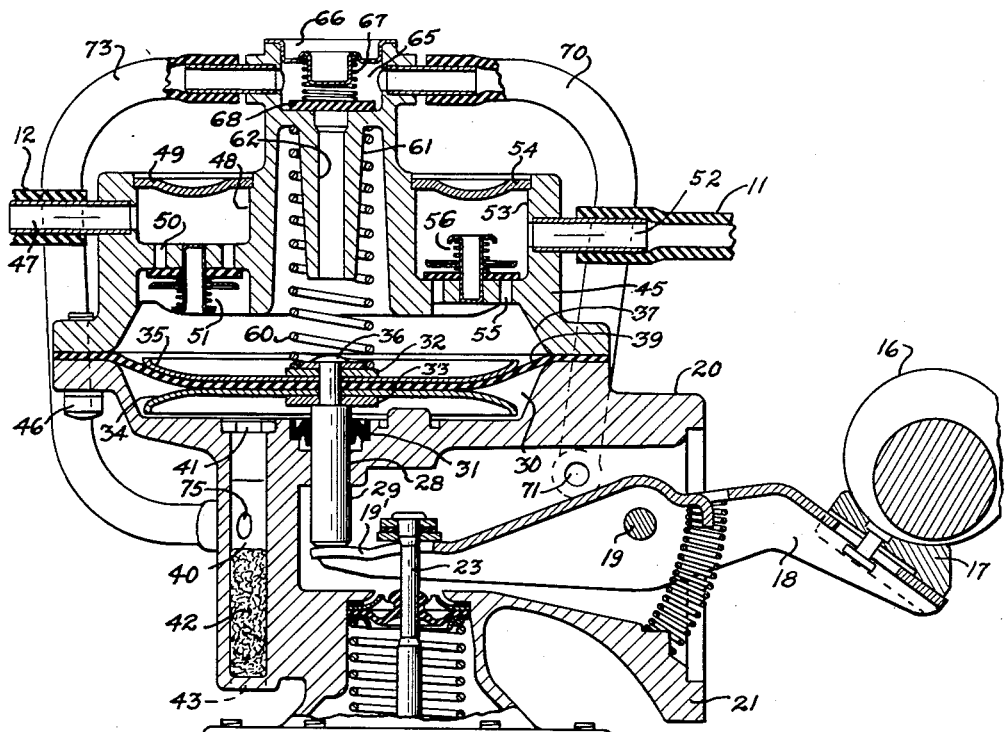
FIG. 2.
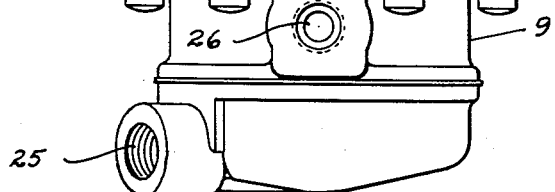
*INVENTOR.*
JACK M. WHITE
BY George R. Ericson
ATTORNEY

United States Patent Office 3,006,535
Patented Oct. 31, 1961

3,006,535
SUCTION BOOSTER
Jack M. White, Normandy, Mo., assignor, by mesne assignments, to ACF Industries, Incorporated, New York, N.Y., a corporation of New Jersey
Filed Mar. 5, 1954, Ser. No. 414,363
2 Claims. (Cl. 230—170)

The present invention relates to diaphragm pumps of the type adapted to be mounted on an engine and powered by an eccentric on the engine camshaft or engine timing gear. More specifically, the invention resides in a novel valve arrangement for a vacuum booster pump.

Where an automotive vehicle accessory includes a suction motor, such as for operating windshield wipers or vacuum brakes, it is customary to provide a suction booster for maintaining power to the accessory when it is in operation at times when the engine manifold suction drops excessively. Under such conditions, the vacuum booster assumes part or all of the load and furnishes sufficient power to maintain the accessory vacuum motor in operation.

There are several reasons why the manifold suction of the engine cannot be depended upon exclusively to furnish this power necessary to run the accessory vacuum motors. Under certain conditions, depending upon the degree of throttle opening and engine speed, suction in the manifold may be negligible.

Under other conditions, which can be attributed to engine malfunctioning, engine manifold suction may decrease to the point where insufficient power is available to drive the suction motors for the accessories.

In power plant systems wherein the fuel charge for the engine is furnished under pressure from a supercharger, the manifold pressure will be the output pressure, less friction and restriction losses, and it is a normal condition to have superatmospheric pressures in the manifold.

In the systems now generally in use, the vacuum booster and fuel pump unit is connected in such a way that the booster section of the pump is in series relation between the intake manifold of the engine and the suction motors. The exhaust stroke of the booster pump is powered directly by the action of the engine-driven eccentric, while the intake stroke of the booster pump is powered directly by a spring compressed on the exhaust stroke of the pump. In such a device, if back pressure exists at the outlet of the booster pump, excessive loading of the drive linkage for the pump occurs. This excess load can be of such magnitude that the operating lever bearing on the eccentric will wear rapidly. In order to avoid rapid wear due to back pressure on the vacuum booster from any causes such as those above mentioned, for example, it is proposed to embody within the vacuum booster an auxiliary valve-controlled pump discharge system. This system may include pump outlet connections to either the engine crankcase or to the atmosphere, or both. By way of illustration, the accompanying drawings show one example of a way of carrying out the invention.

FIG. 1 is a diagrammatic view showing the system including engine and pump connections.

FIG. 2 is a view, partly in section, of the pump unit.

Referring, first, to FIG. 1, an engine 1 is shown on which is illustrated the usual exhaust manifold 2 and intake manifold 3. Connected with both the intake and exhaust manifolds is a heat exchanger 4 providing the usual hotspot for fuel passing into the intake manifold 3 from the carburetor 5.

On the side of the engine 1 is a pump unit 8 with a fuel pump section 9 and vacuum booster section 10.

The exhaust from the vacuum booster section is connected by a line 11 with intake manifold 3, while the intake side of the suction booster is connected by way of a line 12 to the suction motors for driving the accessory devices, all in a manner similar to that already shown in the patent to Hollembeak, et al., 2,623,351 of December 30, 1952.

The fuel pump section 9 of the pump unit 8 has its intake connected with a line 14 extending from the fuel tank of the motor vehicle, and line 15 connects the pump outlet with the carburetor 5.

The booster pump illustrating one form of the instant invention is best illustrated in FIG. 2. In this figure eccentric 16, driven from the engine, is rotatable in a bearing 17 slidably secured to a rocker arm 18. A bearing pin 19 mounts the rocker arm 18 within the lever housing or casing 20 of the pump unit. A flange 21 on the lever housing 20 mounts the pump unit on the engine 1. The opposite end of the rocker arm 18 is slotted at 19' to receive the actauting shaft 23 for the fuel pump generally indicated as 9. This pump can be the same as that shown in the Coffee Patent 2,625,114 of January 13, 1953. It appears sufficient for the understanding of the present invention merely to point out that the pump 9 has an inlet connection 25 and an outlet connection 26.

Lever housing 20 is provided with a bearing 28 receiving a push rod 29. The bearing 28 opens into a pump chamber 30 formed in the upper side of the lever casing 20. An oil seal 31 surrounds the push rod 29 and prevents the passage of oil from the lever housing 20 to the pump chamber 30. The upper end of push rod 29 has a reduced portion for receiving the diaphragm 39 and its assembly which comprises backing washers 32 and 33, and backing plates 34 and 35. The diaphragm assembly is secured in position by upsetting the end of the push rod 29 at 36.

Formed integrally with the lever casing 20 is a chamber 40 opening directly at 41 into the pump chamber 30. Within the chamber 40 is placed sound-deadening material 42 between the opening 41 and an opening 43 to atmosphere. This chamber provides, by way of the outlet 43, means whereby the diaphragm of the pump can breathe within the pump chamber 30.

A valve housing 45 having a valve chamber 37 is suitably secured to the lever casing 20 by a series of cap screws 46, or the like, which also secure the diaphragm between the two casings. The casing 45 has an inlet 47 connected with a chamber 48 sealed by a Welch plug, or the like, 49. A plurality of inlet passages 50 in one wall of valve chamber 37 are controlled by the check valve assembly 51.

Valve casing 45 has an outlet connection 52 which connects with a chamber 53 sealed by a Welch plug 54. In one wall of the chamber 37 are exhaust passages 55 which are controlled by an outlet check valve assembly 56.

The spring 60 for operating the diaphragm on the intake stroke of the suction booster engages the washer 32. This spring 60 surrounds a central guide 61 formed integral with the valve casing 45. An exhaust passage 62 is formed in the guide 61 and extends upwardly to an opening in the chamber 65. Chamber 65 is sealed by a plug 66, which seats a spring 67 for holding a check valve 68 in sealing engagement with the opening from exhaust passage 62 into the chamber 65. A tube 70 connected with the chamber 65 leads to an opening 71 in the lever casing 20. The opposite side of the chamber 65 is connected by way of a tube 73 to an opening 75 within the chamber 40 and to atmosphere through muffler 42 and exhaust port 43.

Operation

Rotation of the cam 16 will operate the arm 18 to reciprocate the fuel pump operating shaft 23 whenever fuel is needed. The same end of the arm 18 bears against the operating shaft 29 for the suction booster pump to reciprocate the shaft 29 within the bearing 28 of the lever housing 20. Shaft 29, when operated by the arm 18, will compress the spring 60 and force the diaphragm 39 upwardly from the pump chamber 30 into the cavity 37 within the valve casing 45 to expel any air trapped within this cavity through the exhaust valve 56 and the outlet 52 to the intake manifold of the engine 1. On the return stroke, the power within spring 60 will force the diaphragm in the opposite direction into the pump cavity 30. Exhaust valve 56 will immediately close, and, substantially simultaneously, intake valve 51 will open and air will be drawn into the pump chamber from the inlet 47, which connects with the suction motors for driving the accessory devices.

When this pump is connected with the intake manifold in the manner shown in FIG. 1, as long as suction is present in the intake manifold the spring 60 of the pump will remain compressed due to the action of suction on diaphragm 39, and the air will be drawn from the suction motor driving the accessories through the inlet 47 of the suction booster into the manifold by way of the outlet connection 52. When conditions exist wherein the manifold suction decreases, then spring 60 will expand, allowing the operating shaft 29 to engage with the rocker arm 18. The suction booster will then come into operation to augment the suction effect in the intake manifold 3. It has been discovered that, if positive pressure is built up in the outlet 52 of the suction booster, the beneficial action of the booster is seriously impaired, and the result would be detrimental to the action of the suction motor driven accessory devices. If back pressure on the suction booster reaches as much as five pounds per square inch gauge pressure, the amount of suction produced by that booster will become negligible. This is probably due to distortion of the diaphragm by the back pressure. However, if a by-pass is provided from the suction booster to atmosphere, the effective operation of the booster is not impaired.

According to this invention, a by-pass for the exhaust from the vacuum booster is provided by way of the passage 62, valve 68, and connections 70 and 73. With this arrangement, back pressure at the outlet 52 has no effect upon operation of the suction booster, and the air is discharged by way of valve 68 through either of the by-passes 70 or 73. With this arrangement, air discharge on the upward stroke of the diaphragm can pass through the line 70 to vent within the crankcase of the engine itself, or through the by-pass 73 into the chamber 40, and thence to atmosphere through the muffler 42 and exhaust 43. Muffler 42, therefore, is used alternatively for the exhaust from chamber 30 and the exhaust through tube 73. In this manner the suction effect produced beneath the diaphragm in the chamber 30 during the exhaust stroke can decrease the back pressure of the muffler on the exhaust through tube 73. On the reverse stroke of the diaphragm any air discharged through the by-pass to the chamber 30 can be forced outward through the muffler 42 and the opening 43, or through the by-pass connections 73 and 70 to the engine crankcase, depending, of course, upon relative pressure at the vent openings 71 and 75.

Applicant has described one embodiment of the invention, but it is contemplated that other modifications thereof will occur to those skilled in the art. The scope of the invention is defined by the appended claims.

I claim:

1. In a motor vehicle, the combination of an engine having an intake manifold, a suction booster pump driven from the engine including a pump chamber, a fluid displacement member mounted in the chamber, positively acting means to move the displacement member in a direction to force air from a portion of the chamber, resilient means acting on said displacement member for producing suction in a portion of said chamber and compressed by said positively acting means for producing compression in said chamber, an intake connection from said pump to drive the suction motor of a vehicle accessory device, a first exhaust connection leading directly from said booster pump chamber to the intake manifold of said engine, check valves controlling the intake and exhaust connections, a by-pass connection to atmospheric pressure, a second exhaust connection leading directly from said pump chamber connecting said chamber with said by-pass connection, and a check valve in said second exhaust connection, said last-named check valve being so loaded as to be operable upon accumulation of back pressure in said first exhaust connection to such a degree as to hold the check valve in the first exhaust connection closed and thereby permit the discharge of air from said pump chamber to said by-pass connection to relieve pressure on said fluid displacement member.

2. In a system for operating suction powered accessory devices on a vehicle, a housing having a pump chamber provided with an air inlet, a primary air outlet connected directly thereto and a secondary air outlet connected directly thereto and leading to atmospheric pressure, check valves in said inlet and outlets, a pump member mounted for reciprocable movement in said chamber, a source of suction connected to said primary air outlet operable to draw air through said inlet and pump chamber and to move said pump member in one direction, a compression spring yieldably resisting movement of said member in said one direction and operable responsive to a decrease in suction from said source to move said member in the opposite direction, and mechanical power actuated means operable responsive to movement of said member in said opposite direction to engage and move said member in said one direction to discharge air from said chamber through the air outlet having the lowest back pressure.

References Cited in the file of this patent

UNITED STATES PATENTS

| | | |
|---|---|---|
| 2,079,406 | Harry | May 4, 1937 |
| 2,189,526 | Babitch | Feb. 5, 1940 |
| 2,246,932 | Collins | June 24, 1941 |
| 2,623,351 | Hollembeak et al. | Dec. 30, 1952 |
| 2,717,612 | Affleck | Sept. 13, 1955 |